United States Patent
Griffin et al.

(10) Patent No.: US 7,293,565 B2
(45) Date of Patent: Nov. 13, 2007

(54) ELECTRICALLY HEATED CIGARETTE SMOKING SYSTEM

(75) Inventors: William T. Griffin, Chesterfield, VA (US); John M. Adams, Mechanicsville, VA (US); Charles T. Higgins, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 529 days.

(21) Appl. No.: 10/608,089

(22) Filed: Jun. 30, 2003

(65) Prior Publication Data

US 2004/0261802 A1   Dec. 30, 2004

(51) Int. Cl.
*F24F 1/22* (2006.01)
(52) U.S. Cl. .................................................... 131/329
(58) Field of Classification Search ............... 131/329; D13/107–110; 320/110–115
See application file for complete search history.

(56) References Cited

U.S. PATENT DOCUMENTS

| | | | |
|---|---|---|---|
| 2,518,538 A | 8/1950 | Giblin | |
| 3,448,365 A | 6/1969 | Jacobson | |
| 4,255,645 A | 3/1981 | Vitaloni | |
| 5,088,673 A | 2/1992 | Chandler | |
| 5,269,327 A | 12/1993 | Counts et al. | |
| 5,388,594 A | 2/1995 | Counts et al. | |
| 5,745,565 A | 4/1998 | Wakefield | |
| 5,878,752 A | 3/1999 | Adams et al. | |
| 5,897,041 A | 4/1999 | Ney et al. | |
| 5,934,289 A | 8/1999 | Watkins et al. | |
| 5,954,979 A | 9/1999 | Counts et al. | |
| 5,967,148 A | 10/1999 | Harris et al. | |
| 6,057,668 A | 5/2000 | Chao | |
| 6,100,663 A | 8/2000 | Boys et al. | |
| 6,113,049 A | 9/2000 | Miljanich | |
| D439,219 S * | 3/2001 | Minagawa et al. | D13/108 |
| D443,717 S | 6/2001 | Minagawa et al. | |
| 6,249,107 B1 | 6/2001 | Wolfe et al. | |
| D445,760 S | 7/2001 | Minagawa et al. | |
| 6,318,590 B1 | 11/2001 | McMurray-Stivers | |
| 6,349,728 B1 | 2/2002 | Pham | |
| 6,351,098 B1 | 2/2002 | Kaneko | |
| D455,397 S * | 4/2002 | Weiner et al. | D13/108 |
| D467,868 S | 12/2002 | Chemla et al. | |

\* cited by examiner

*Primary Examiner*—Carlos Lopez
(74) *Attorney, Agent, or Firm*—Buchanan Ingersoll & Rooney PC

(57) ABSTRACT

A stand for an electrically heated cigarette smoking device can removably support an electrically heated cigarette smoking device, which includes a rechargeable power supply. The stand is configured to fit in a receptacle, such as a receptacle in a vehicle. Charging electronics controls charging of the rechargeable power supply when the electrically heated cigarette smoking device is supported by the stand, and the electrically heated cigarette smoking device or stand is electrically connected to the external power supply.

3 Claims, 10 Drawing Sheets

ELECTRICALLY HEATED CIGARETTE SMOKING SYSTEM

BACKGROUND

Commonly-assigned U.S. Pat. No. 5,388,594, which is incorporated herein by reference in its entirety, discloses an electrical smoking;system that includes an electrically heated cigarette smoking device. An electrical smoking system, such as that disclosed in the '594 patent, can provide sensations of smoking that closely resemble those experienced during smoking of a conventional cigarette, but without certain disadvantages. Other exemplary electrically heated cigarette smoking systems are disclosed in commonly-assigned U.S. Pat. Nos. 5,269,327; 5,878,752; 5,954,979; 5,967,148; and 6,349,728, each of which is incorporated herein by reference in its entirety.

SUMMARY

A stand for an electrically heated cigarette smoking device is provided. A preferred embodiment of the stand is adapted to support an electrically heated cigarette smoking device including a rechargeable power supply, and a charger for the electrically heated cigarette smoking device.

In another preferred embodiment, the stand provides electrical connection to a power source that provides power to the electrically heated smoking device. Charging electronics in the electrically heated cigarette smoking device, or in the stand, control charging of the rechargeable power supply.

In another preferred embodiment, the stand provides charging capabilities for an electrically heated cigarette smoking device.

The stand can include fasteners to allow the stand to be removably or permanently fastened to a surface.

In a preferred embodiment, the stand is configured to fit in a cup holder of a vehicle. In such embodiment, the power source for the electrically heated cigarette smoking device can be a power source in the vehicle.

In a preferred embodiment, the stand includes an opening configured to receive an electrically heated cigarette smoking device. Accordingly, the device can be stored on the stand when not held by a user.

In a preferred embodiment, the stand operates on direct current (DC). Accordingly, a rechargeable DC power supply of the electrically heated cigarette smoking device can be recharged by electrically connecting the stand to a DC power source.

In another preferred embodiment, the stand includes inductive charging electronics operable to convert DC supplied to the stand by a DC power source to alternating current (AC), and convert the AC back to DC, to recharge the power supply of the electrically heated cigarette smoking device.

DETAILED DESCRIPTION OF PREFERRED EMBODIMENTS

A stand useful for storing an electrically heated cigarette smoking device is provided. The stand can be used in various vehicles including automobiles, trucks, buses, and the like.

Figure 1:
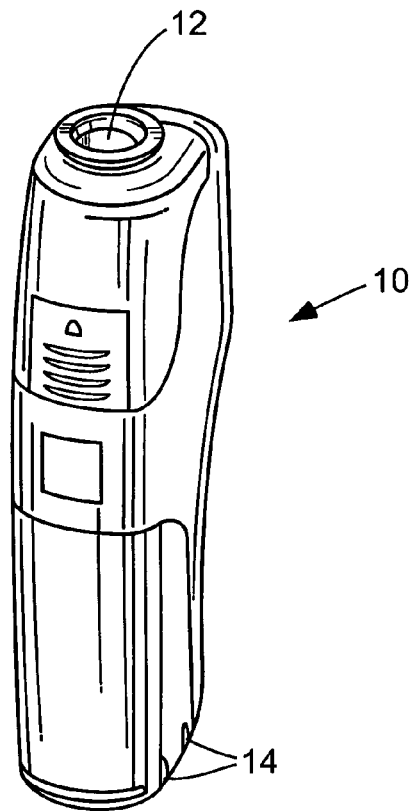
FIG. 1 depicts an embodiment of an electrically heated cigarette smoking device, which can be used with preferred embodiments of the stand.
Figure 2:
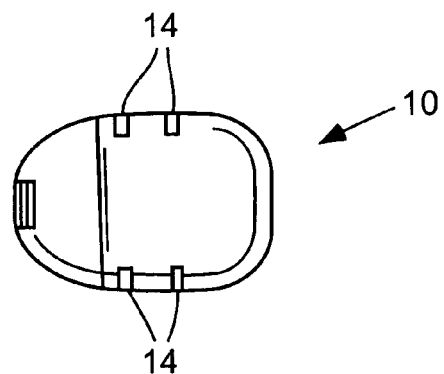
FIG. 2 is a bottom plan view of the electrically heated cigarette smoking device shown in FIG. 1.

FIGS. 1 and 2 illustrate an exemplary electrically heated cigarette smoking device 10 that can be used with preferred embodiments of the stand. The electrically heated smoking device 10 is disclosed in commonly-assigned U.S. Pat. No. D443,717, which is incorporated herein by reference in its entirety. The electrically heated cigarette smoking device 10 includes an internal power supply. The power supply can include one or more batteries and/or capacitors. An opening 12 is sized to allow for the insertion of an electrically heated cigarette into the electrically heated cigarette smoking device 10. The electrically heated cigarette is heated by a heater inside the electrically heated cigarette smoking device. The electrically heated cigarette smoking device 10 also includes electrical contacts 14 on opposed sides. The electrical contacts 14 provide electrical contact to a charger for the electrically heated cigarette smoking device, as described below.

The electrically heated cigarette is smoked in a similar manner as a traditional cigarette. However, the heater heats the cigarette without lighting or continuous smoldering of the cigarette. These and other characteristics of electrically heated cigarette smoking systems make them attractive for use in confined spaces.

Figure 3:
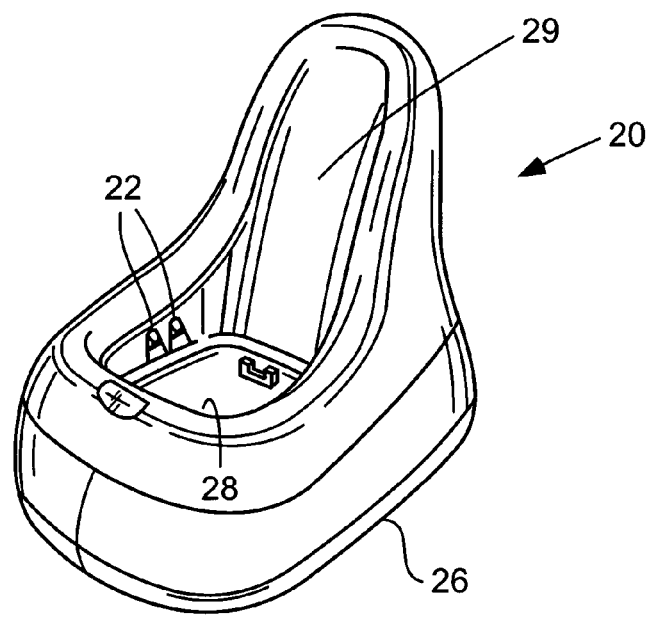
FIG. 3 is a front perspective view of a charger for an electrically heated cigarette smoking device.
Figure 4:
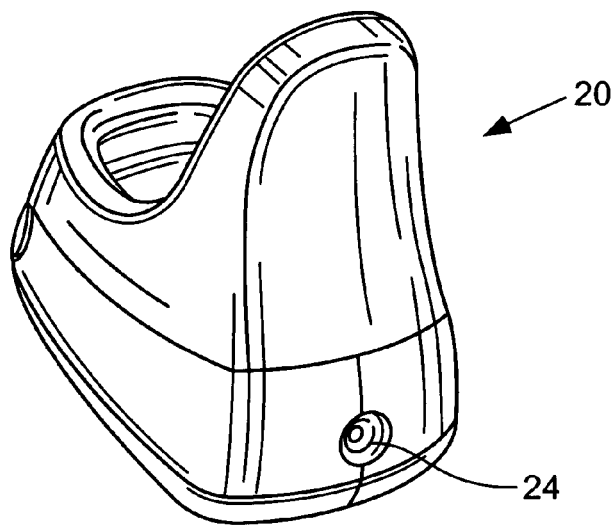
FIG. 4 is a rear perspective view of the charger shown in FIG. 3.
Figure 5:
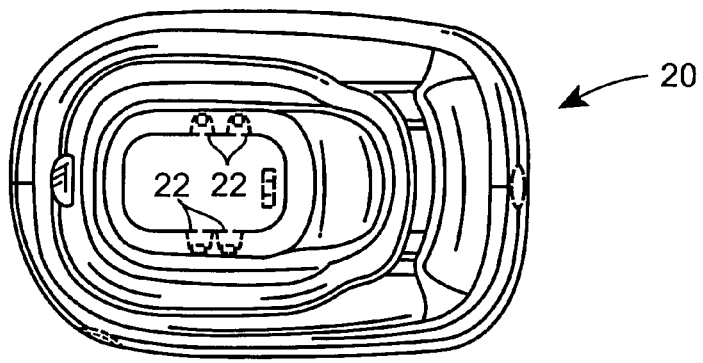
FIG. 5 is a top plan view of the charger shown in FIG. 3.

The electrically heated cigarette smoking device 10 can be used with various chargers, such as those illustrated in FIGS. 3-11, as well as with other chargers. FIGS. 3-5 illustrate an embodiment of a charger 20 disclosed in commonly-assigned U.S. Pat. No. D455,397 which is incorporated herein by reference in its entirety. The charger 20 includes pairs of opposed electrical contacts 22 positioned to contact the electrical contacts 14 of the electrically heated cigarette smoking device 10 when supported on the charger 20 in an upstanding position. The charger 20 also includes a socket 24 adapted to receive a plug of an electrical conductor to provide electrical connection of the electrically heated cigarette smoking device 10 supported on the charger 20 to an external power source.

The charger 20 has a bottom support surface 26, which is shaped to rest on a support surface. The charger 20 also includes surfaces 28 and 29, which are shaped to support the electrically heated cigarette smoking device 10.

The electrically heated cigarette smoking device 10 can include an internal power supply, and charging electronics operable to control charging of the power supply by an external power source when the electrically heated cigarette smoking device 10 is supported on the charger 20.

Figure 6:
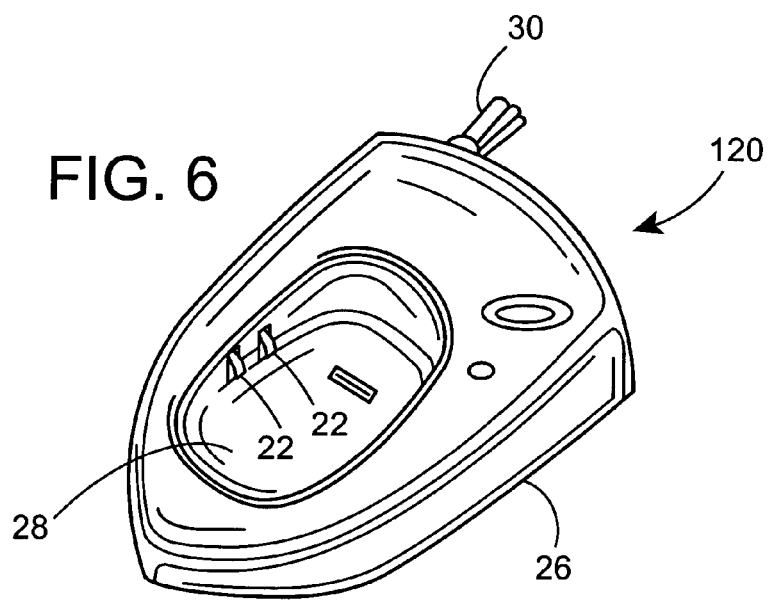
FIG. 6 is a front perspective view of another embodiment of a charger for an electrically heated cigarette smoking device.
Figure 7:
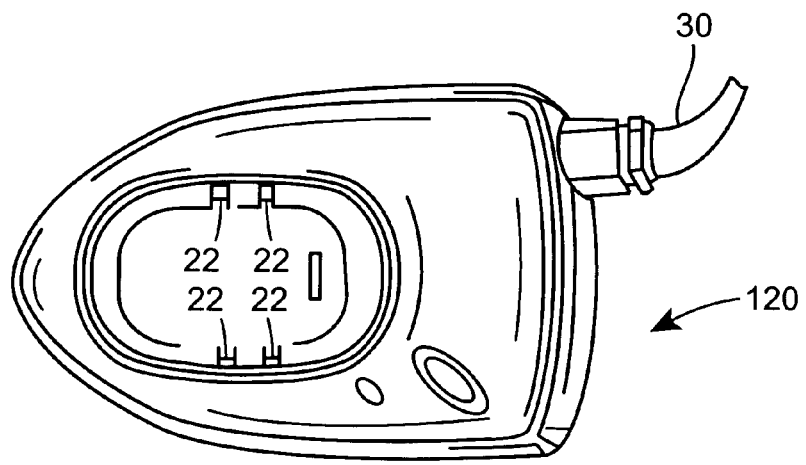
FIG. 7 is a top plan view of the charger shown in FIG. 6.

FIGS. 6 and 7 illustrate another embodiment of a charger 120 disclosed in commonly-assigned U.S. Pat. No. D439,219, which is incorporated herein by reference in its entirety. The charger 120 includes electrical contacts 22 for contacting the electrical contacts 14 of the electrically heated cigarette smoking device 10 when supported on the charger 120, and an electrical conductor 30 for connecting the charger 120 to an external power source. The charger 120 has a bottom surface 26, which can support the electrically heated cigarette smoking device 10 on a surface, and an inner surface 28 for supporting the electrically heated cigarette smoking device 10.

Figure 8:
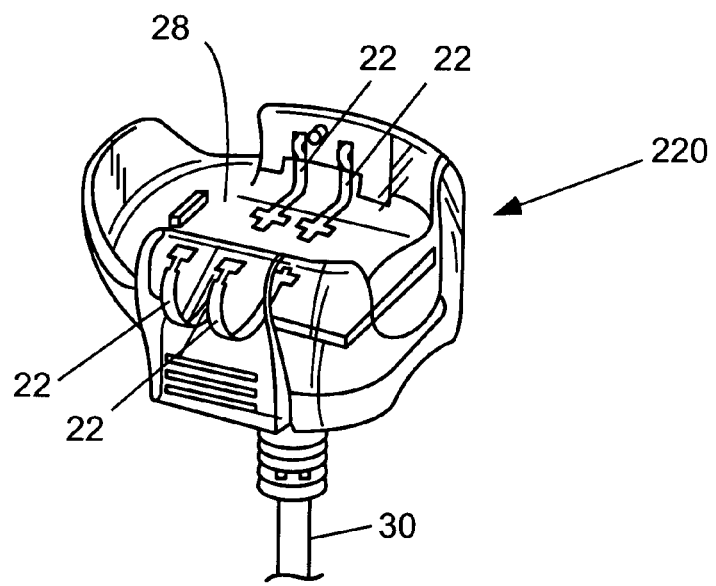
FIG. 8 is a front, top perspective view of another embodiment of a charger for an electrically heated cigarette smoking device.

FIG. 8 illustrates another embodiment of a charger 220 disclosed in commonly-assigned U.S. Pat. No. D445,760, which is incorporated herein by reference in its entirety. The charger 220 includes electrical contacts 22 for contacting the electrical contacts 14 of the electrically heated cigarette smoking device 10 when supported on the charger 10, and an electrical conductor 30 for connecting the charger 220 to an external power source. The charger 220 has an inner surface 28 for supporting the electrically heated cigarette smoking device 10.

Figure 9:
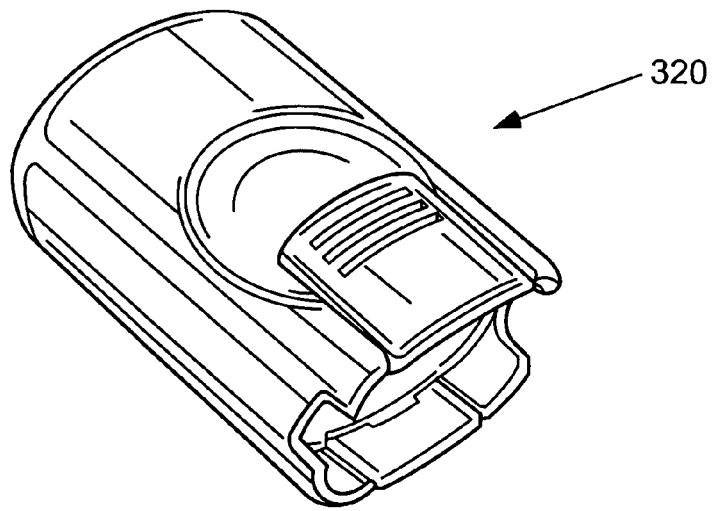
FIG. 9 is a front perspective view of another embodiment of a charger for an electrically heated cigarette smoking device.
Figure 10:
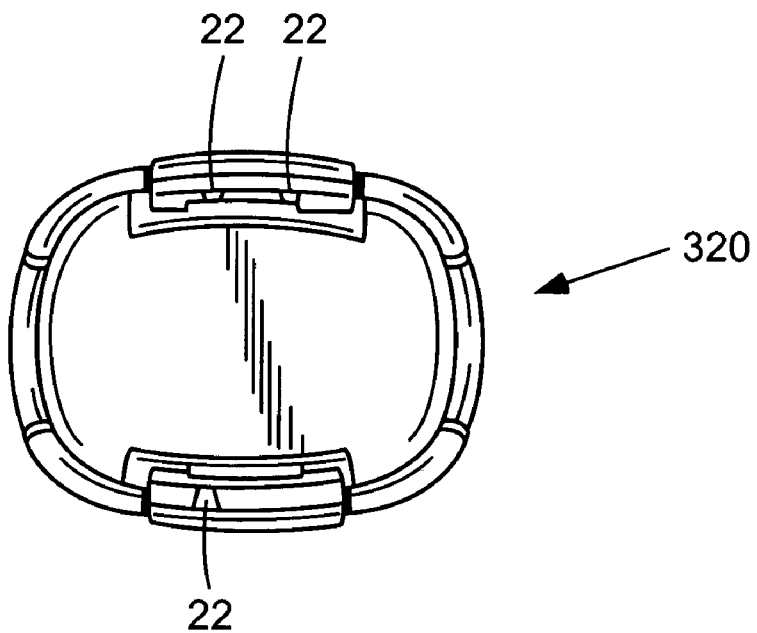
FIG. 10 is a top plan view of the charger shown in FIG. 9.
Figure 11:
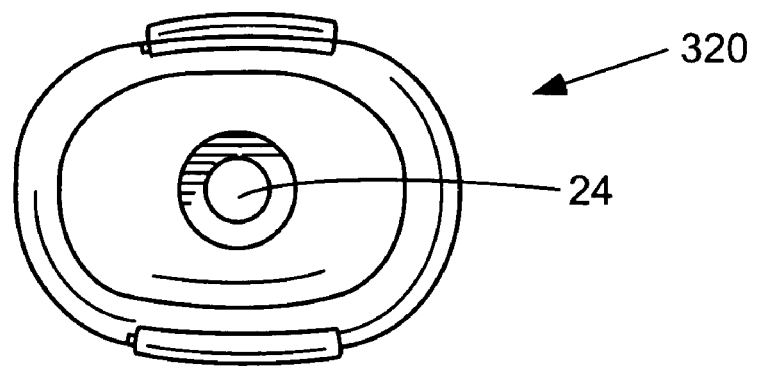
FIG. 11 is a bottom plan view of the charger shown in FIG. 9.

FIGS. 9-11 illustrate another embodiment of a charger 320 disclosed in commonly-assigned U.S. Pat. No. D467,868, which is incorporated herein by reference in its entirety. The charger 320 includes electrical contacts 22 for contacting the electrical contacts 14 of the electrically heated cigarette smoking device 10 when supported on the charger 320, and a socket 24 for receiving a connector of an electrical conductor to connect the charger 320 to an external power source.

Figure 12:
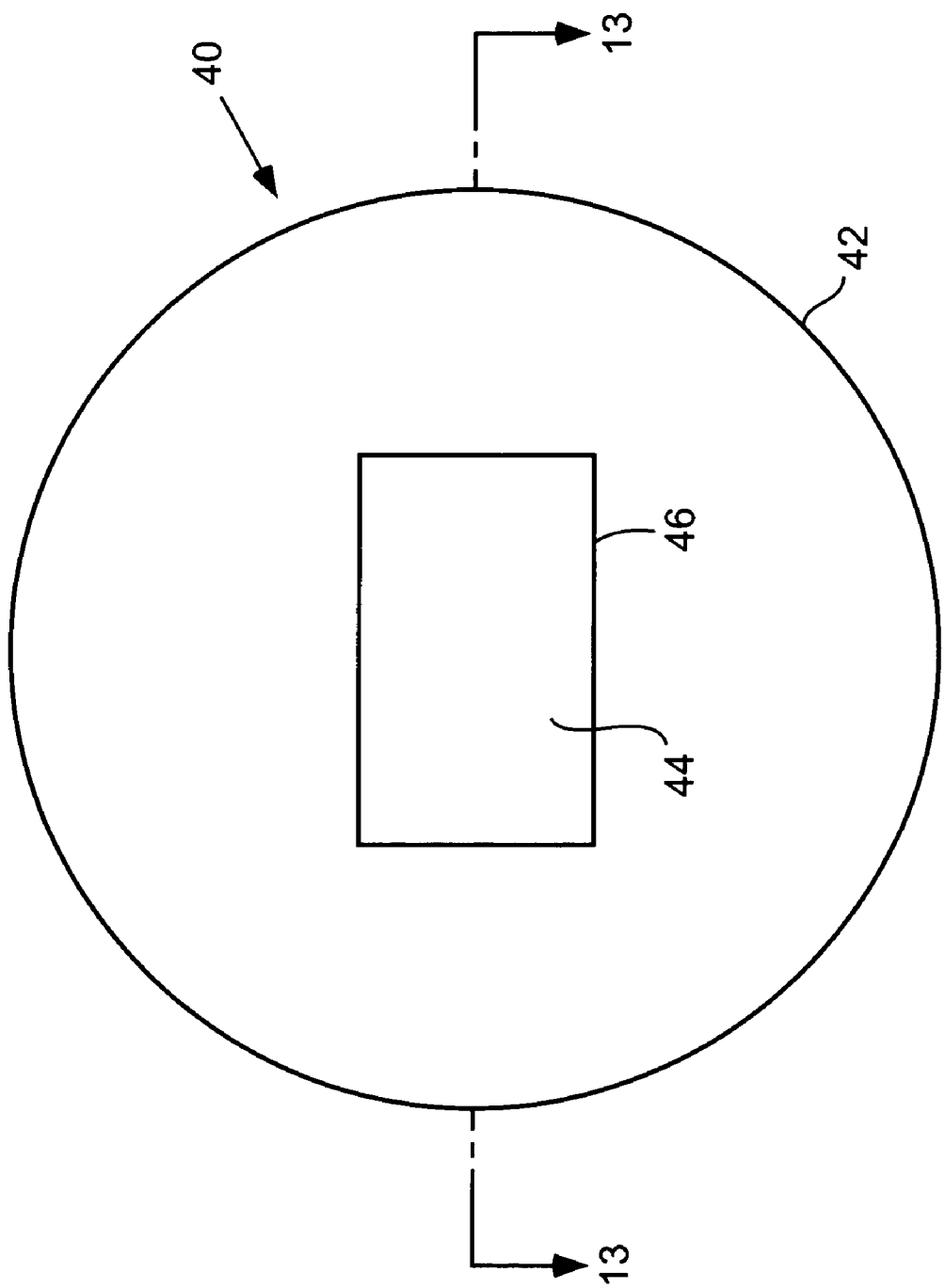
FIG. 12 is a top plan view of a preferred embodiment of the stand.
Figure 13:
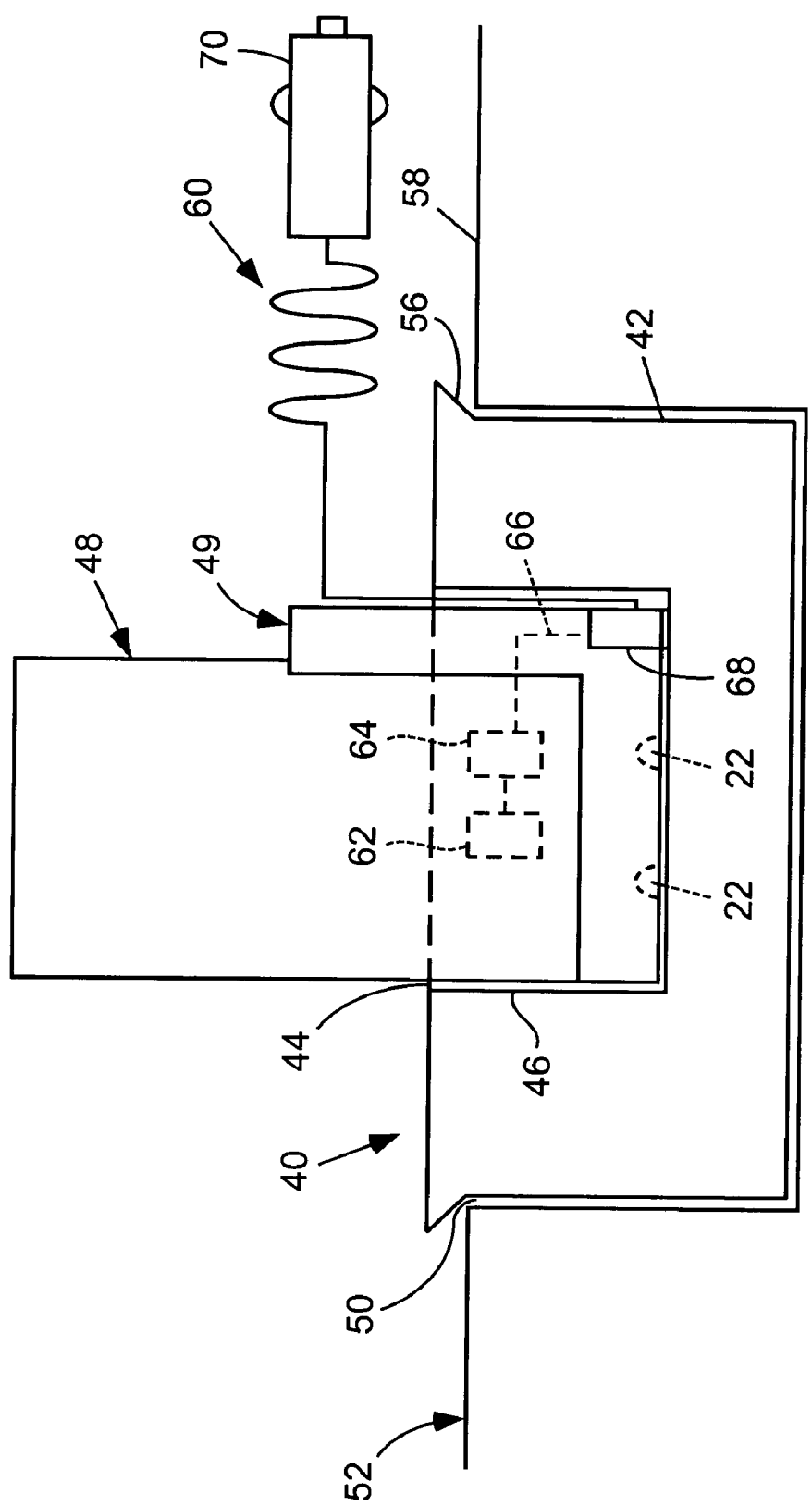
FIG. 13 is a sectional view in the direction of line 13-13 of FIG. 12, further depicting the stand supporting an electrically heated cigarette smoking device and a charger supported on the stand, with the stand received in a receptacle.

FIGS. 12 and 13 illustrate a preferred embodiment of a stand 40. The stand 40 includes an outer surface 42 and a surface 46 defining an opening 44. The opening 44 is configured to receive an electrically heated cigarette smoking device 48, such as the electrically heated smoking device 10 described above, as well as other electrically heated cigarette smoking devices having different constructions, and a charger 49, such as the charger 20, 120, 220 or 320, as described above, or other chargers having different constructions. The charger 49 preferably supports the electrically heated cigarette smoking device 48 in an upright orientation when the electrically heated cigarette smoking device 48 and the charger 49 are stored on the stand 40.

The opening 44 can have various shapes and sizes to enable the charger 49, which can have various configurations, to fit in the opening 44. For example, the opening 44 can be rectangular as depicted in FIG. 12. Alternatively, the opening 44 can have various other shapes, such as round, square, oval, or the like, to receive a like-shaped charger.

The outer surface 42 of the stand 40 preferably is configured to mate with a receptacle 50 defined in a body 52. The body 52 can be a console or other portion of an automobile, truck, bus, or other vehicle, for example. The receptacle 50 is preferably a vehicle cup holder designed to receive a cup, can, or other beverage container.

Accordingly, the stand 40 preferably can have various shapes and sizes that allow it to mate with different shaped and sized receptacles 50. As depicted in FIG. 12, the outer surface 42 of the stand 40 can be cylindrical shaped to mate with a cylindrical car cup holder, for example.

The outer surface 42 of the stand 40 preferably includes a peripheral edge 56. The peripheral edge 56 can be angled outwardly as shown, or alternatively can have other configurations, such as that of a rim. The stand 40 can have a suitable height relative to the depth of the receptacle 50, such that a portion of the peripheral edge 56 contacts the surface 58 of the body 52 when the stand 40 is placed in the receptacle 50. In this position, the peripheral edge 56 can be grasped by a user to remove the stand 40 from the receptacle 50.

An electrical conductor 60 is connected to the charger 49 to electrically connect the internal power supply 62 of the electrically heated cigarette smoking device 10 to an external power source. The power supply 62 is connected to charging electronics 64 via wiring 66. The electrical conductor 60 preferably is adapted to mate with a socket 68 of the charger 49, such as the socket 24 depicted in FIG. 4. The electrical conductor 60 preferably includes an adapter plug 70 constructed to removably mate with a socket of an external power source. For example, the external power source can be a battery powered electrical cigarette lighter of a vehicle.

In a preferred embodiment, the charger 49 and the electrically heated cigarette smoking device 48 operate on direct current (DC). The stand 40 can be constructed to operate with DC power sources, such as vehicle batteries, that supply various voltages, such as 6, 9, 12 or 24 volt power sources.

In another preferred embodiment, the charger 49 includes inductive charging electronics and associated electrical elements that can convert DC from a DC power source to alternating current (AC), and convert the AC back to DC to charge the power supply 62 of the electrically heated cigarette smoking device 48. For example, an inductive field can be generated in the charger 49 by passing current through a coil. A matching coil can be provided in the charger 49 to produce AC. A diode and other suitable electronics can be provided in the charger 49 convert the AC to DC to charge the internal power supply 62.

Figure 14:
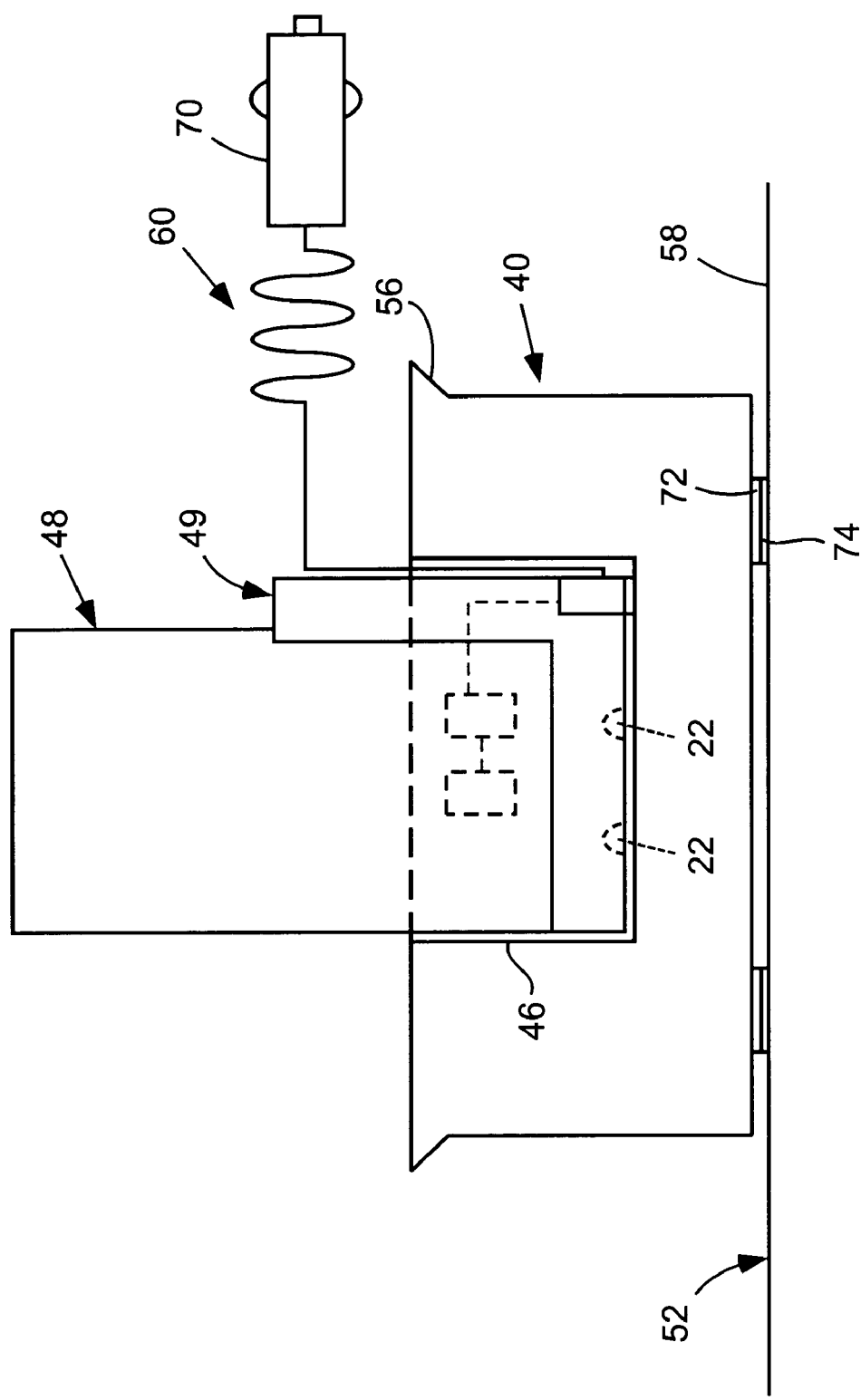
FIG. 14 shows the stand, electrically heated cigarette smoking device, and charger depicted in FIG. 13, with the stand fastened to a surface.

FIG. 14 shows another preferred embodiment of the stand 40 including one or more fasteners 72 for engaging mating fasteners 74 on the surface 58 of the body 52, to allow attachment of the stand 40 to the surface 58. The surface 58 can be a surface in a vehicle, for example. The fasteners 72, 74 can be any suitable fasteners, such as hook and loop-type fasteners (VELCRO™) or the like, to allow the stand 40 to be removably attached to the surface 58. Alternatively, the fasteners 72 can include a magnetic material to removably attach the stand 40 to a metal surface. The stand 40 can include fasteners for permanent attachment to the surface 58. Such permanent fasteners can include, screws, bolts, clips, or the like. The stand 40 can alternatively be secured to the surface using an adhesive material.

Figure 15:
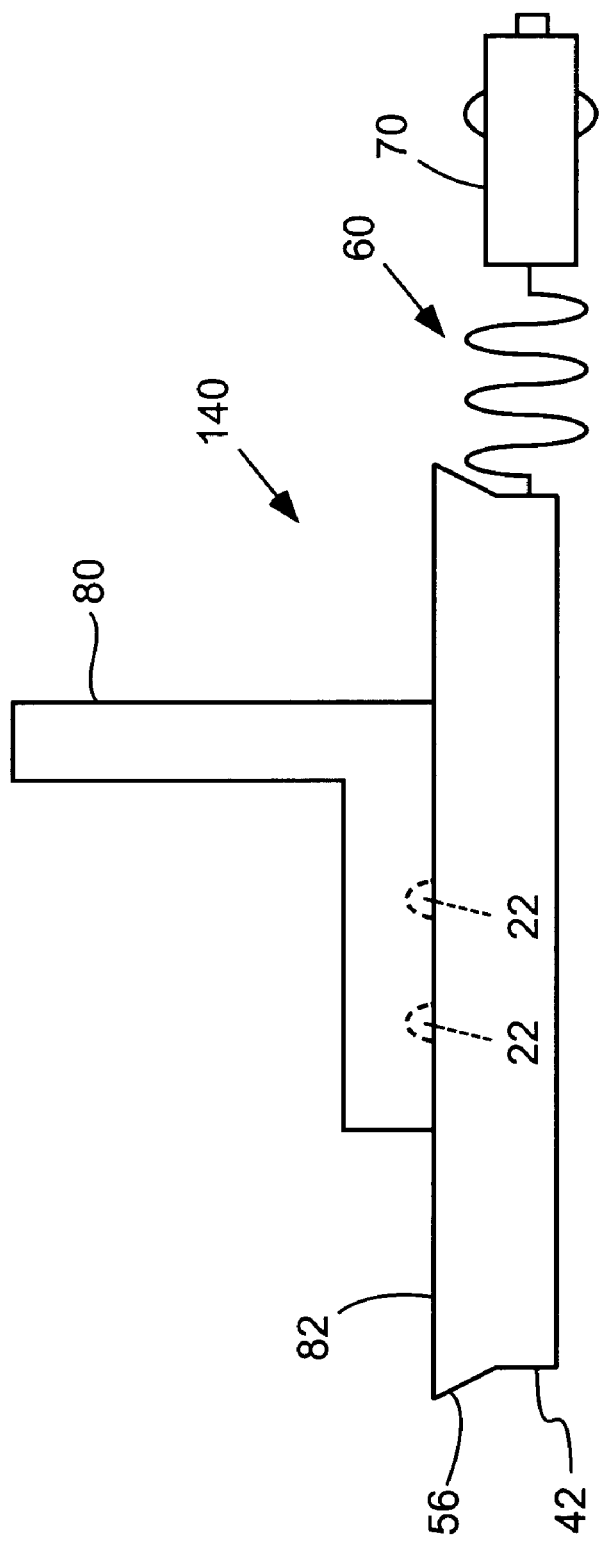
FIG. 15 is a side view of another preferred embodiment of the stand including a base for supporting an electrically heated cigarette smoking device.

Another preferred embodiment of the stand 140 is shown in FIG. 15. The stand 140 includes a base 80 provided on a surface 82. The base 80 is preferably L-shaped or the like, to support an electrically heated cigarette smoking device, preferably upright, when not being held by a user. Charging electronics are preferably provided in the base 80. The base 80 also includes electrical contacts 22, such as two opposed pairs of electrical contacts as shown in FIGS. 5 and 7, which mate with electrical contacts of the electrically heated cigarette smoking device (such as electrical contacts 14 shown in FIG. 1) when supported on the stand 140. An electrical conductor 60 is also provided on the stand 140.

The stand 140 can include one or more fasteners (as described above) to allow removable or permanent attachment of the stand 140 to a surface.

As described above, the internal power supply of the electrically heated cigarette smoking device can be charged by supplying DC current directly from an external power source to the power supply, or alternatively the stand 140 can include inductive charging electronics for converting DC to AC and vice versa.

Figure 16:
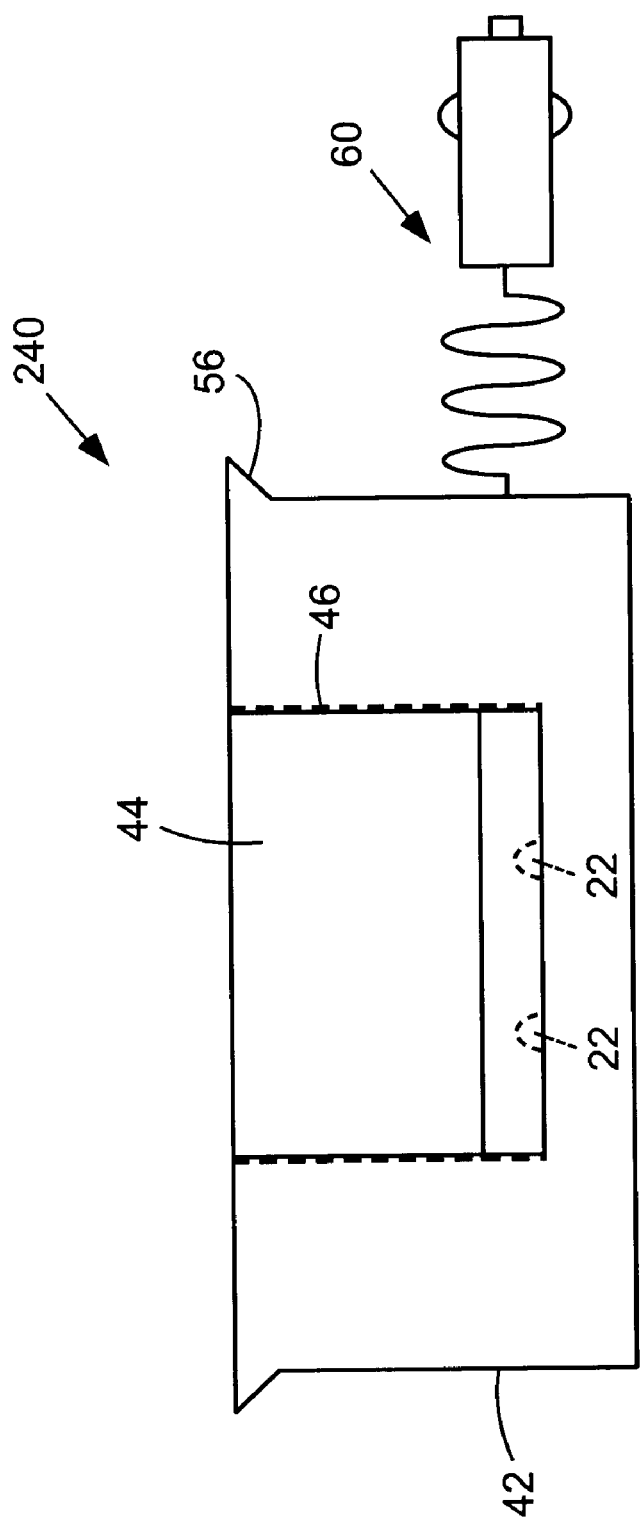
FIG. 16 depicts another preferred embodiment of the stand.

Another preferred embodiment of the stand 240 is shown in FIG. 16. In this embodiment, charging electronics are provided in the stand 240. The stand 240 preferably includes electrical contacts 22, which mate with contacts provided on the electrically heated cigarette smoking device.

The stand 240 can include one or more fasteners (as described above) to allow removable or permanent attachment of the stand 240 to a surface.

As described above, the internal power supply of the electrically heated cigarette smoking device can be charged by supplying DC current directly from an external power source to the power supply, or alternatively the stand 240 can include inductive charging electronics for converting DC to AC and vice versa.

Accordingly, preferred embodiments of the stand are suitable for use in a vehicle, as well as in other means of transportation. In addition, the stand can be configured to mate with receptacles provided in vehicles, and to be compatible with vehicle power sources. The stand provides for convenient storage and recharging of electrically heated cigarette smoking devices in such applications.

As described above, the stand preferably can be used with existing electrically heated cigarette smoking devices, or the stand can be configured to receive future designs of electrically heated cigarette smoking devices.

While the invention has been described in detail with reference to preferred embodiments thereof, it will be apparent to those skilled in the art that various changes and modifications can be made, and equivalents employed, without departing from the scope of the appended claims.

What is claimed is:

1. An electrically heated cigarette smoking system, comprising:
    an electrically heated cigarette smoking device including a rechargeable power supply; and
    a stand comprising:
        a base configured to removably support the electrically heated cigarette smoking device, the base including electrical contacts which electrically contact electrical contacts on the electrically heated cigarette smoking device to electrically connect the rechargeable power supply to the stand, and a surface configured to fit removably in a receptacle and/or to support the stand on an external surface; and
        optional charging electronics provided in the base, the charging electronics being operable to control charging of the rechargeable power supply;
        wherein the stand is operable to supply electrical power to the rechargeable power supply and charging electronics when the electrically heated cigarette smoking device is supported on the base and the stand is electrically connected to an external power supply via an electrical conductor.

2. The electrically heated cigarette smoking system of claim 1, wherein the base comprises the charging electronics.

3. The electrically heated cigarette smoking system of claim 1, wherein the outer surface of the base is cylindrical shaped to fit removably in a cylindrical receptacle.

* * * * *